No. 896,782. PATENTED AUG. 25, 1908.
J. WEGNER & W. F. MEYERS.
STONE SAWING MACHINE.
APPLICATION FILED APR. 11, 1907.

Witnesses:
Wm. Ashley Kelly
Bernard Cowen

Inventors
Julius Wegner
Willard F. Meyers
by Henry A. Williams
Atty.

No. 896,782. PATENTED AUG. 25, 1908.
J. WEGNER & W. F. MEYERS.
STONE SAWING MACHINE.
APPLICATION FILED APR. 11, 1907.

Witnesses:
Inventors
Julius Wegner
Willard F. Meyers
by Henry D. Williams
Atty.

No. 896,782. PATENTED AUG. 25, 1908.
J. WEGNER & W. F. MEYERS.
STONE SAWING MACHINE.
APPLICATION FILED APR. 11, 1907.

Witnesses:
Wm. Ashley Kelly
Bernard Cowen

Inventors
Julius Wegner
Willard F. Meyers
by Henry D. Williams
Atty.

UNITED STATES PATENT OFFICE.

JULIUS WEGNER, OF ASTORIA, AND WILLARD F. MEYERS, OF LONG ISLAND CITY, NEW YORK; SAID WEGNER ASSIGNOR TO SAID MEYERS.

STONE-SAWING MACHINE.

No. 896,782.

Specification of Letters Patent.

Patented Aug. 25, 1908.

Application filed April 11, 1907. Serial No. 367,544.

*To all whom it may concern:*

Be it known that we, JULIUS WEGNER, a subject of the Czar of Russia, residing at Astoria, borough of Queens, county of Queens, and State of New York, and WILLARD F. MEYERS, a citizen of the United States, residing at Long Island City, borough of Queens, in the county of Queens and State of New York, have invented a certain new and useful Improvement in Stone-Sawing Machines, of which the following is a specification, reference being had therein to the accompanying drawings, forming a part thereof.

Our invention relates particularly to machines for dividing rough blocks of stone and for rough-dressing them or finishing them for according to the character of the work.

The object of the invention is to produce a machine in which a great variety of operations may be performed with a minimum expenditure of time in adjusting the machine and setting up the work, and to this end the machine is provided with means for adjusting the saws both angularly and laterally, and with means for feeding the saws in two directions at fast or slow speed.

Certain minor details of construction resulting in improved operation and facility in construction of the machine are also hereinafter described.

We will now describe the construction embodying our invention shown in the accompanying drawings, and will thereafter point out our invention in claims.

Figure 1 is a side elevation of a stone-sawing machine embodying the present invention. Fig. 1ª is an enlarged sectional detail on the line 1ª of Fig. 1. Fig. 2 is a plan view, partly in section, of the machine, the driving motor being omitted.

The illustrated embodiment of the invention comprises two rotary saws with means for actuating them, means for supporting the saws having provision for both angular and lateral adjustment of the saws to determine the character of the operation on the stone, slow-feeding mechanism for feeding the saws during their operation, and quick-feeding or moving mechanism to facilitate the preliminary operation of bringing the saws into working position.

Figure 4:
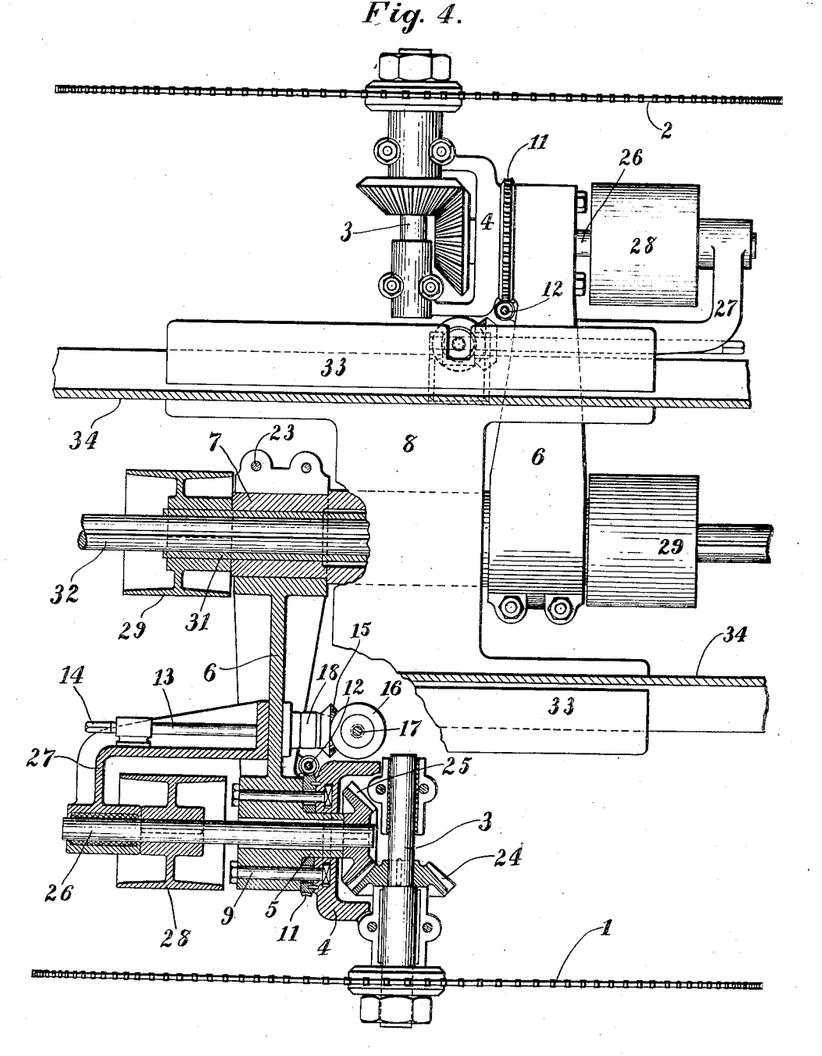
Fig. 4 is a plan view, partly in section, of the saw carriage and saws and their adjustable connections.
Figure 5:
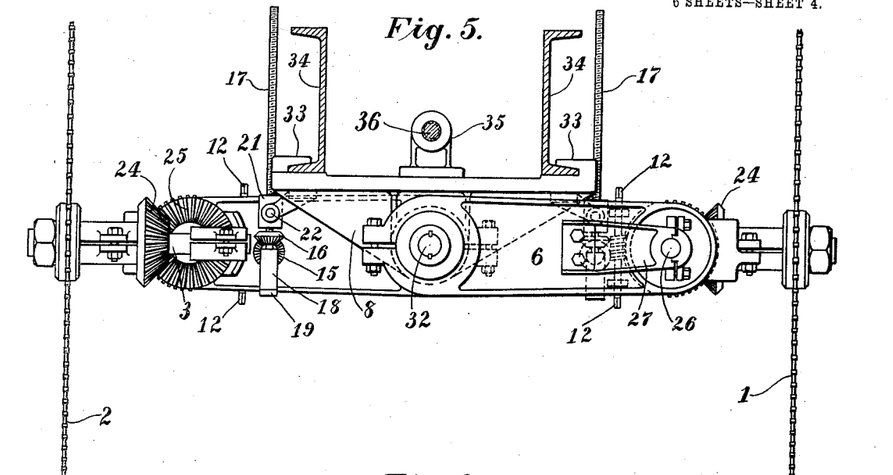
Figs. 5 and 6 are end elevations of the saws and the saw carriage, showing the saws in differently adjusted positions, looking from left to right of the machine as represented in the preceding figures.

The saws, 1 and 2, are mounted on short shafts 3 journaled in yokes 4 (Fig. 4). The yokes are journaled in turn on sleeves 5, projecting from the ends of supporting arms 6 journaled on sleeves 7 projecting from, and integral with, the saw carriage 8. The yokes 4 and arms 6 constitute adjustable connections between the saws and the carriage, for by reason of the yokes being swiveled on the arms the saws may be adjusted angularly with relation to each other and the work while by reason of the arms being swung or pivoted on the carriage the saws may be adjusted laterally and the distance between their peripheries may be adjusted. The yokes 4 are held in adjusted position by bolts 9 engaging annular T-shaped slots in the yokes. To effect the angular adjustment of the saws, means are provided for adjusting the yokes when the bolts are loosened, these means comprising worm wheels 11 fixed to the yokes and worms 12 journaled on the arms 6 and provided with squared extremities for the reception of a wrench, as shown in Fig. 5.

Figure 6:
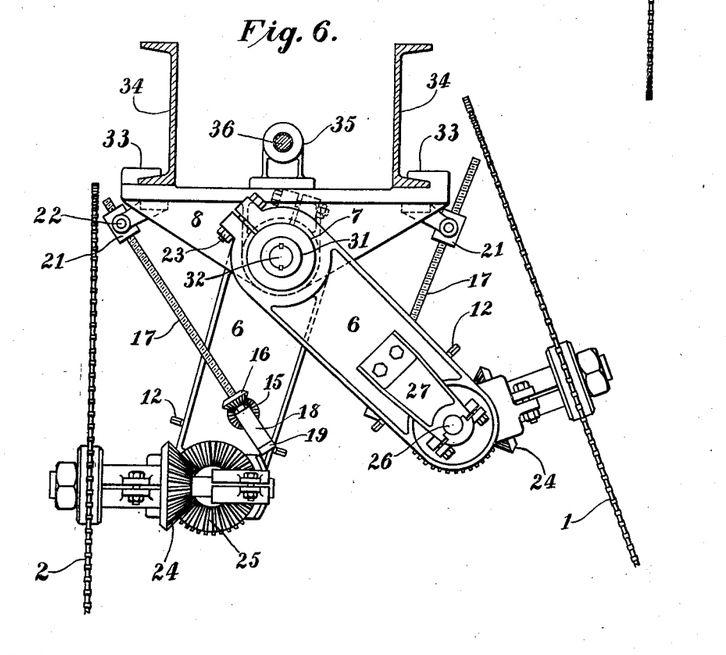

To effect the lateral adjustment of the saws, means are provided for adjusting the arms 6. On each arm is journaled a shaft 13 having a squared extremity 14 to receive a wrench. The shaft carries a bevel gear 15 engaging a bevel gear 16 fixed on a screw 17 (Figs. 5 and 6). The screw is journaled at one end in a swivel sleeve 18 pivotally connected with the arms 6 concentrically with the axis of the shaft 13, and a collar or head 19 confines the screw in the sleeve. The other end of the screw engages a nut 21 pivotally connected at 22 with the carriage 8. By turning the shaft 13 the screw 17 may be turned and the arm 6 swung upward and outward or downward and inward between the extreme positions shown in Figs. 5 and 6, thus effecting lateral adjustment of the saw. To hold the arms rigidly in adjusted position, their ends are split and provided with clamp bolts 23 by which they may be clamped upon the sleeves 7.

To actuate the saws the saw shafts 3 are provided with bevel gears 24 engaged by gears 25 on counter-shafts 26 journaled at one end in the arms 6 and at the other in brackets 27 mounted on the arms. Pulleys 28 on the counter-shafts are connected by belts with pulleys 29 fixed on the ends of a sleeve 31 journaled in the sleeves 7 on the carriage. A driving shaft 32, journaled in the frame as shown, passes through the sleeve 31 and is splined thereto, as shown, so that the saws may be actuated without regard to longitudinal movement of the carriage with respect to the driving shaft. It is evident that the arrangement of this saw-actuating mechanism is such that its operation is not disturbed by changes in the adjustment of the arms 6 and the yokes 4.

The saw-feeding mechanism is arranged to feed the saws both horizontally and vertically. To permit horizontal movement the carriage 8 is suspended by gibs 33, from ways on a horizontal frame 34 along which the carriage slides. A nut 35 on the carriage is engaged by a horizontal feed screw 36 by which the carriage is horizontally actuated or fed.

Figures 1, 1A, 2:
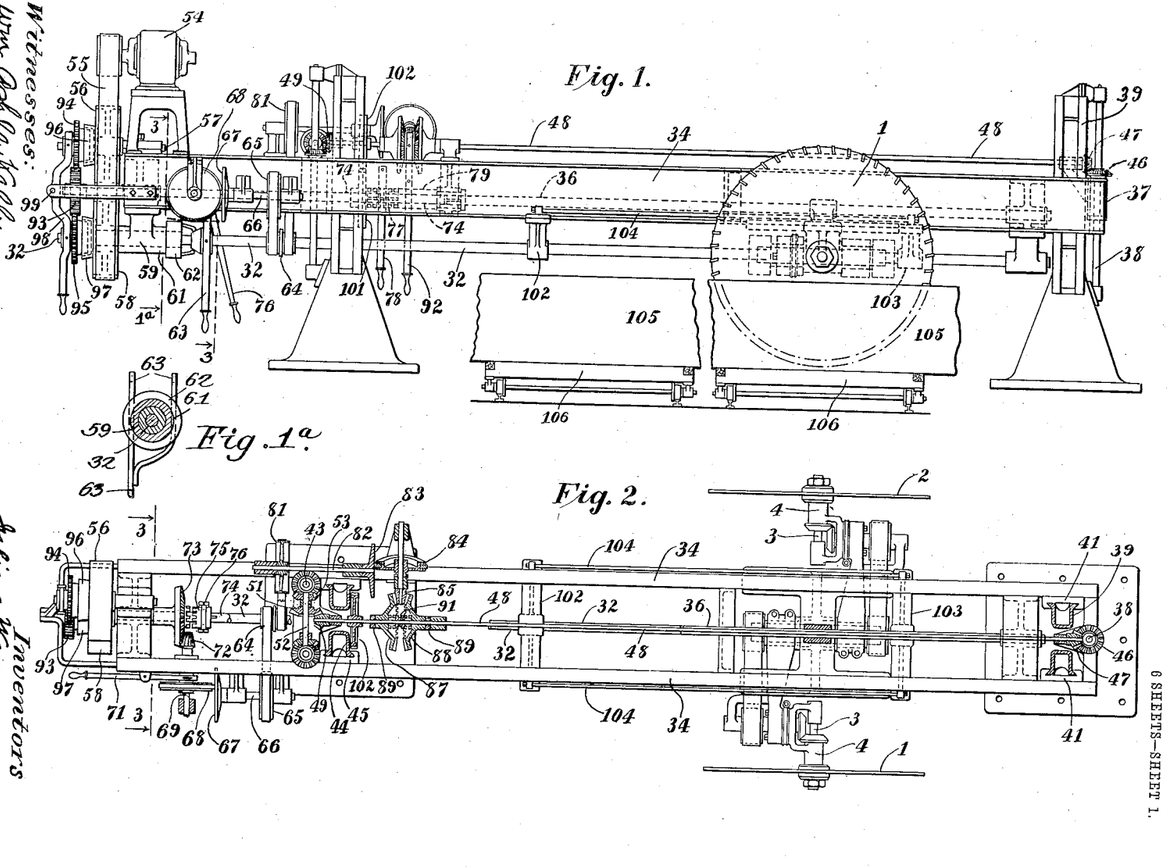
Figure 3:
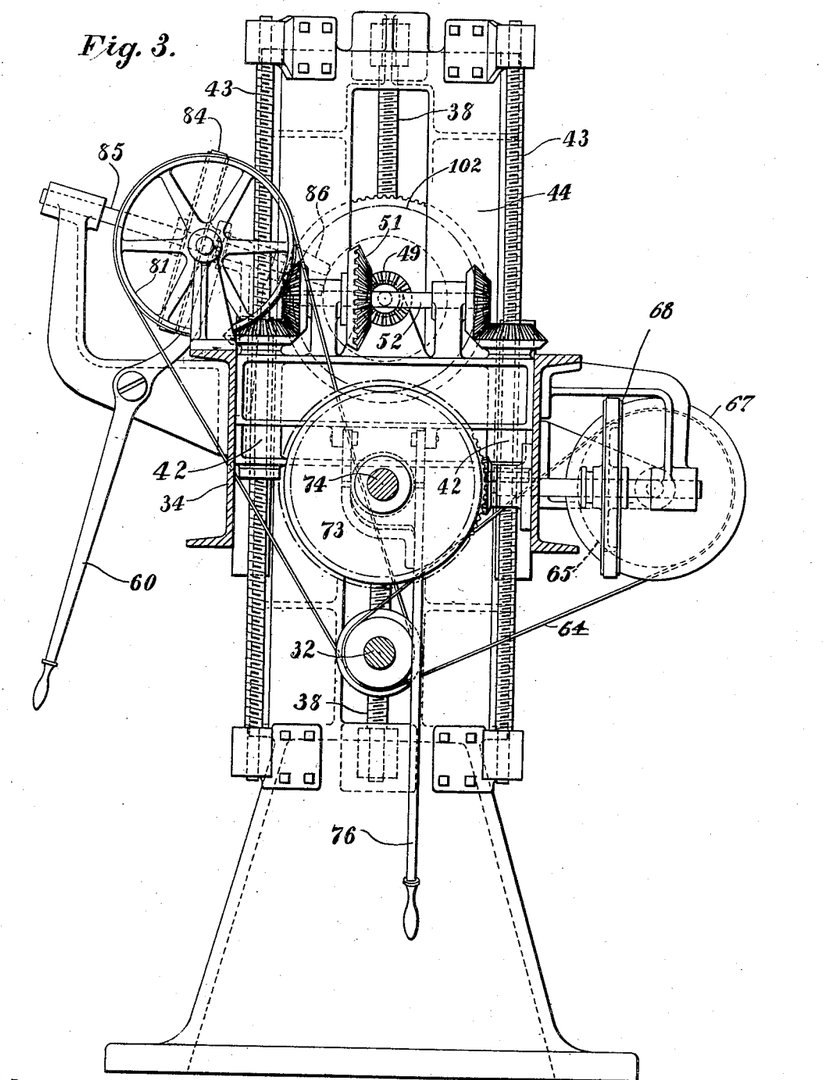
Fig. 3 is a sectional elevation of the machine on the lines 3—3, Figs. 1 and 2, looking from left to right.
Figure 7:
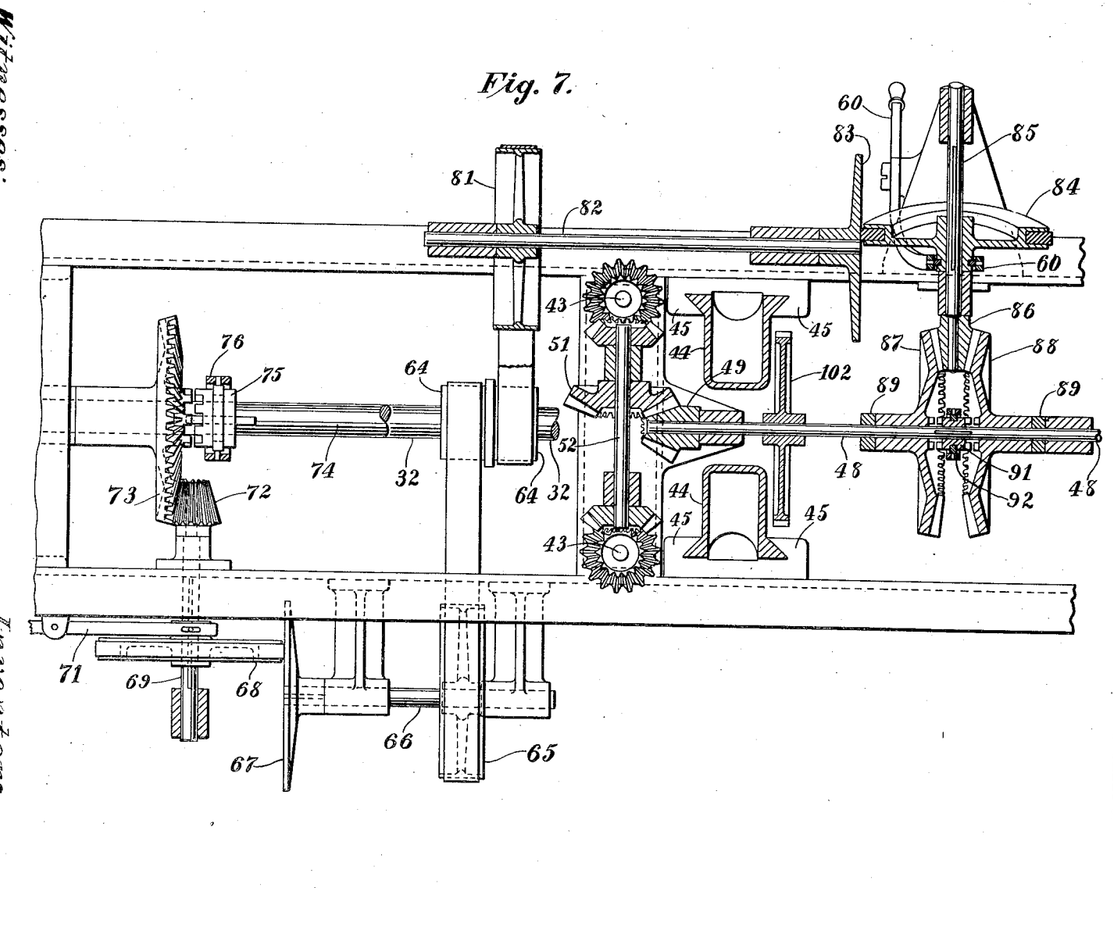
Fig. 7 is a plan view, partly in section, showing details of the feeding mechanisms.

Vertical feeding movements of the saws are accomplished by moving the frame 34 vertically as a whole. A rotatable lifting nut 37 at the right-hand end of the frame, as illustrated, engages a stationary elevating screw 38 which is supported on a column 39. To guide the frame in its vertical movements the column is provided, as shown in Fig. 2, with dove-tail ways engaged by dove-tail gibs 41 on the frame 34. Near the left-hand end of the frame are two rotatable lifting nuts 42 (Fig. 3) engaging two stationary elevating screws 43 supported on a column 44 which is engaged by gibs 45 on the frame (Figs. 2 and 7). The weight of the frame and the mechanisms carried thereby is supported by the screws 38 and 43, the rotatable nuts having at their lower ends collars as shown on which the frame rests. As the screws are all of the same pitch, as shown, by turning the lifting nuts 37 and 42 in unison the frame may be fed up or down with an equal and parallel motion of all its parts. To actuate the lifting nuts in this manner the nut 37 is provided with a bevel gear 46 engaged by a bevel pinion 47 on a horizontal shaft 48 journaled on the frame, and at the other end of the shaft is a bevel pinion 49 engaging a bevel gear 51 on a cross-shaft 52 geared at its ends to the lifting nuts 42. By rotating the shaft 48 the lifting nuts may all be rotated in unison, the direction of the screw threads being such as to operate in harmony to raise or lower the frame.

The mechanism from which power for the performance of the functions above described is derived will now be described. An electric motor 54 is mounted on the frame 34. A belt 55, driven by the motor, passes about one side of a pulley 56, loosely journaled on a stub shaft 57 on the frame, and then around a second pulley 58 which carries a sleeve 59 (shown in dotted lines in Fig. 1 and in transverse section in Fig. 1ᵃ) journaled in a bearing 61 on the frame. The belt thus operates to rotate the pulleys 56 and 58 in opposite directions. The driving shaft 32 by which the saws are rotated is shown as journaled in and passing through the sleeve 59. To start or stop the saws the sleeve 59 and the shaft 32 may be connected together or disconnected by a friction clutch 62 of ordinary form controlled by a hand lever 63.

The mechanism for imparting the slow feeds to the saws during the sawing operation is actuated from the driving shaft 32. A double pulley 64 on the shaft is connected by a belt as shown in Figs. 1, 2, 3 and 7, with a pulley 65 fixed to a shaft 66 journaled on the frame. A friction disk 67 on the end of the shaft 66 is engaged by a friction wheel 68, which is splined to a cross-shaft 69 so that it may be moved along the shaft by a hand lever 71 (Fig. 2) and caused to engage different parts of the face of the disk 67 to secure different speed ratios. The shaft 69 carries a bevel pinion 72 engaging a gear 73 loosely journaled on a counter-shaft 74 which is journaled on the frame in alinement with the feed screw 36. By means of a tooth clutch 75 of ordinary form, controlled by a hand lever 76, the gear 73 may be connected at will with the counter-shaft 74. Another tooth clutch 77 of ordinary form (Fig. 1) is interposed between the counter-shaft and the feed screw and is controlled by a hand lever 78. When a slow longitudinal feed of the carriage is desired the clutch 75 is engaged and the clutch 77 is thrown to the right so as to connect the counter-shaft 74 with a sleeve 79 fixed on the end of the feed screw 36 and serving as a bearing for the shaft 74. The feed screw is then slowly rotated, and the rate of feed may be varied by means of the frictional driving mechanism comprising the disk 67 and the wheel 68.

For the slow vertical feed the pulley 64 is connected with a pulley 81 on a shaft 82 connected through a friction disk 83 and a friction wheel 84 splined on a cross-shaft 85 so that it may be moved along the shaft by a hand lever 60 (Fig. 3) and made to engage different parts of the face of the disk 83 to obtain different speed ratios of the slow vertical feed. The shaft 85 carries a bevel pinion 86. The pinion 86 engages two gears 87 and 88 loosely journaled between two collars 89 on the vertical-feed shaft 48, and the gears are rotated constantly in opposite directions. A tooth clutch 91 of ordinary form is arranged between the gears so as to engage them alternatively with the shaft 48, so that the shaft may be driven in either direction, or may be at rest when the clutch is in its median position. The clutch is controlled by a hand lever 92. By these means the raising nuts may be actuated to feed the frame slowly either up or down on the screws at a variable rate.

To facilitate the movement of the carriage and frame in the preliminary adjustment of the saws, a rapid actuation or movement is accomplished through the counter-shaft 74. This shaft carries at its left-hand end a gear 93 engaged by gears 94 and 95 loosely journaled on the stub-shaft 57 and the shaft 32 respectively. The gears 94 and 95 carry each a member of two cone clutches 96 and 97, of which the other members are carried by the pulleys 56 and 58. A hand lever 98 pivotally mounted at 99 operates to throw the clutches alternatively into and out of engagement, so that the gear 93 and the counter-shaft 74 may be rotated rapidly in either direction, or may be left free when the hand lever is in its median position with both clutches disconnected.

When a rapid horizontal movement is desired the hand lever 98 is thrown to one side or the other, and the clutch 77 is thrown to the right to connect the counter-shaft 74 and the feed screw 36. When a rapid vertical movement is desired the clutch 77 is thrown to the left, so as to disconnect the counter-shaft and the feed screw, and in this position the clutch 77 connects the counter-shaft with a gear 101 loosely journaled thereon and meshing with a gear 102 fixed on the vertical-feed shaft 48. During these operations the slow-feed clutches 75 and 91 are in their non-operative positions, so that the gear 73, for the horizontal slow feed, and the gears 87 and 88 for the vertical slow feed, do not actuate the shafts 74 and 48 respectively, but either rotate idly or remain at rest according as the saw driving shaft is rotating or not.

Figures 8, 9, 10, 11, 12, 13:
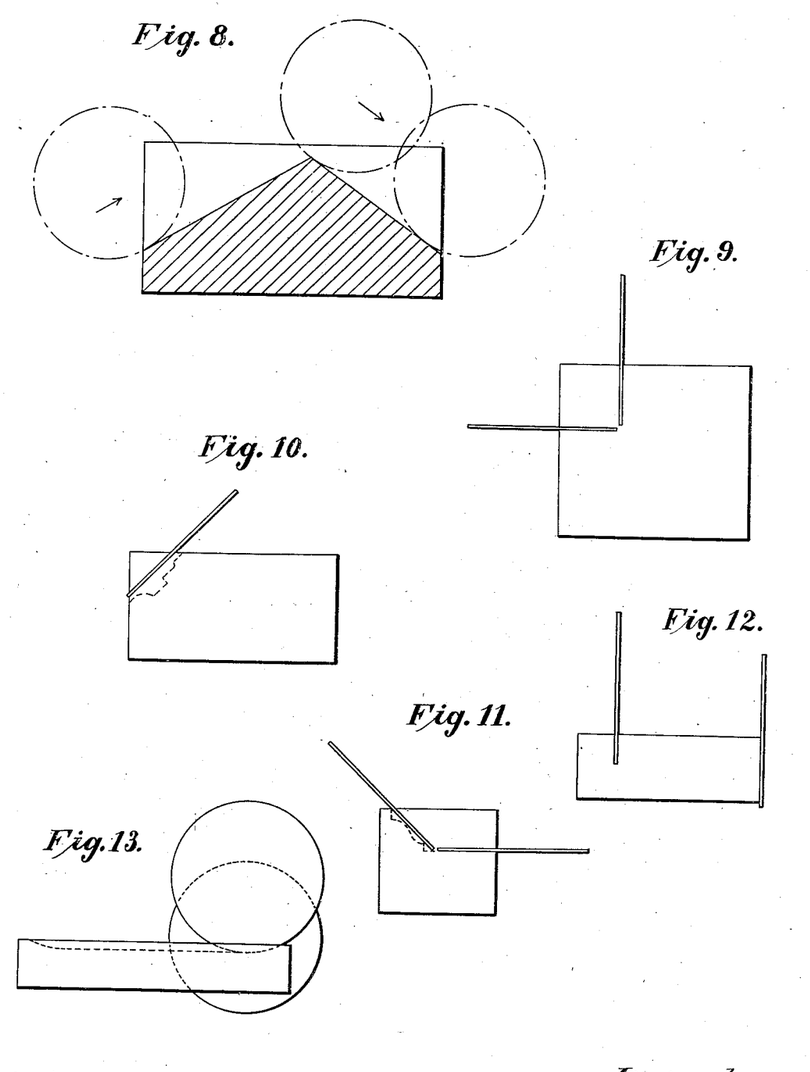
Figs. 8, 9, 10, 11, 12 and 13 are diagrammatic views showing various operations which may be performed by the saws.

By means of the various feeds and adjustments of the machine the saws may be caused to perform a great variety of operations. The stone 105 is moved under the machine on a suitable car or carriage 106, and the saws are then adjusted to the proper position on the carriage. By means of the quick-feed or moving mechanism the saws are then brought into position to engage the stone, and the slow-feed mechanism is then thrown into operation to feed the saws during the cutting operation. It is obvious that for large stones the carriages 106 may be coupled together, or, as shown, they may be used independently, as desired. The saws may be used either singly or together, and may be set to perform duplicate operations or to participate in a single operation or to perform different operations. When one or both of the saws are in operation in a vertical plane both slow-feeds may be used together, and thereby a cut with an inclined termination may be produced, as in Fig. 8. A rabbet or shoulder may be formed, as in Fig. 9, by adjusting the saws on the carriage so that they form an angle with each other and so that their peripheries are close together at the point of cutting. In performing this operation the horizontal feed only is used. A bevel may be formed, as in Fig. 10, by one saw alone, or a cornice may be roughed out, as in Fig. 11, by using both saws. By operating both of the saws in vertical planes with one at a higher level than the other, while employing the horizontal feed, a "check" may be formed and a stone "faced" on one side at the same time, as in Fig. 12. With the saws substantially in the same position as in Fig. 12, a panel may be outlined with one saw, as indicated in elevation in Fig. 13, while at the same time the stone is "faced" with the other saw. In this operation the feeds are properly manipulated to determine the limits of the panel while allowing the lower or facing saw, on account of the lower position, to cut entirely through and out at the end of the stone, as shown.

As the driving shaft 32 is of considerable length it is desirable to support it between the carriage and the frame. For this purpose two hangers, 102 and 103, are slidably suspended from the ways on the frame 34, and the hangers are connected by side rods 104 so that when one hanger is displaced by the movement of the carriage in either direction the other hanger is moved to operative position behind the carriage.

In addition to the features of construction relating to the general mode of operation of the machine, there are various details of construction which are novel and useful. The employment of two laterally-located elevating screws at one end of the frame permits the use of a central saw-driving shaft at this point and has the further advantage of furnishing a firm three-point support for the frame. The connection between the saw-driving shaft and the slow-feed mechanism is such that the feed stops when the rotation of such shaft stops, and thus the accidental disconnection of the driving clutch 62 cannot result in damage to the machine, as would occur if the feed continued.

It is obvious that various modifications may be made in the construction shown and above particularly described within the principle and scope of my invention.

We claim:

1. A stone-sawing machine having, in combination, a saw, means for supporting the saw in angularly-adjustable position, means for actuating the saw, and mechanism for feeding it in two directions in the same plane.

2. A stone-sawing machine having, in combination, a saw, means for supporting and actuating the saw, means for relatively feeding the saw and work in one direction, means for relatively feeding the saw and the work in another direction, and mechanism for actuating the two feeding means simultaneously to cause the saw to cut on an oblique line resultant from the two directions of feed.

3. A stone-sawing machine having, in combination, a saw, means for supporting and actuating the saw, means for relatively feeding the work and the saw in one direction, means for relatively feeding the work and the saw in another direction, and mechanism for actuating the two feeding means simultaneously, one of said means being operable at variable speed with respect to the other so that the inclination of the resultant line of feed may be varied.

4. A stone-sawing machine having, in combination, a saw, means for actuating the saw, including a shaft on which the saw is mounted, and means for supporting the shaft and saw comprising a swinging arm pivoted at one end and adjustable on its pivot, and a bearing for the shaft supported at the other end of the arm and angularly-adjustable on the arm relatively to the length of the arm and to the axis of the shaft.

5. A stone-sawing machine having, in combination, a frame provided with ways, a carriage movable on the ways, an arm pivotally-mounted on the carriage, a shaft bearing mounted and angularly-adjustable on the arm relatively to the length of the arm, a shaft journaled in the bearing so as to be angularly adjusted therewith, a saw mounted on the shaft, means for rotating the shaft to actuate the saw, and means for feeding the carriage along the ways.

6. A stone sawing machine having, in combination, a saw, means for supporting and actuating the saw, means for feeding the saw in one direction, means for feeding the saw in another direction, mechanism for independently and concurrently actuating the two feeding mechanisms, and means for moving the saw in two directions at relatively high speeds to bring it into operative position.

7. A stone sawing machine having, in combination, a saw, means for supporting and actuating the saw, means for feeding the saw in one direction, means for feeding the saw in another direction, mechanism for concurrently actuating the two feeding mechanisms at relatively variable speeds, and means for moving the saw in two directions at relatively higher speeds to bring it into operative position.

8. A stone-sawing machine having, in combination, two rotary saws, means for supporting and simultaneously actuating the saws, means for adjustment of the position of the saws relatively to each other, and means for feeding the saws to the work.

9. A stone-sawing machine having, in combination, a frame provided with ways, a carriage movable along the ways, two saws supported by the carriage through connections permitting angular adjustment of the saws about lines parallel to the direction of movement of the carriage on the ways, means for actuating the saws, and means for feeding the carriage along the ways.

10. A stone-sawing machine having, in combination, a vertically-movable frame provided with horizontal ways, a carriage movable on the ways, a saw mounted on the carriage and adjustable to different angular positions about a line parallel to the direction of movement of the carriage on the ways, means for actuating the saw, means for feeding the frame vertically, and means for feeding the carriage along the ways.

11. A stone-sawing machine having, in combination, a saw-supporting frame, a saw-actuating shaft mounted longitudinally on the frame, and three frame-supporting screws of which one is connected with the frame near one end thereof and the others are connected with the frame near its other end and on opposite sides of the line of the saw-actuating shaft.

12. A stone-sawing machine having, in combination, a frame provided with ways, a saw-supporting carriage movable on the ways, a saw-actuating shaft journaled on the frame and arranged parallel with the ways, and a shaft hanger supporting the shaft between the carriage and the shaft journal, the hanger being movable along the ways by engagement with the carriage so as to avoid interference with the movements of the carriage.

13. A stone-sawing machine having, in combination, a frame provided with ways, a saw-supporting carriage movable on the ways, a saw-actuating shaft journaled on the frame and arranged parallel with the ways, two shaft hangers movably-mounted on the ways on opposite sides of the carriage and engaging and supporting the shaft between the shaft journals and the carriage, and connections between the shaft hangers operating to move one hanger into operative position as the other hanger is moved out of operative position.

14. A stone-sawing machine having, in combination, means for supporting the saw in angularly-adjustable position, means for actuating the saw, mechanism for feeding the saw in horizontal direction, and mechanism for independently feeding the saw in a vertical direction.

15. A stone-sawing machine having, in combination, a saw, means for supporting and actuating the saw, means for feeding the saw in one direction, means for feeding the saw in another direction, and mechanism for independently and concurrently actuating the two feeding mechanisms.

16. A stone-sawing machine having, in combination, a saw, means for supporting and actuating the saw, means for feeding the saw in one direction, means for feeding the saw in another direction, and mechanism for concurrently actuating the two feeding means at relatively variable speeds.

17. A stone-sawing machine having, in combination, a plurality of saws disposed parallel to each other, means for supporting and actuating the saws, and means for independently adjusting the saws edgewise without altering their relative parallelism.

18. A stone-sawing machine having, in combination, two saws disposed in vertical parallel planes, means for supporting and concurrently actuating the saws, and means for adjusting the relative vertical position of the saws.

19. A stone-sawing machine having, in combination, two saws, means for supporting and concurrently actuating the saws, means for adjusting the angular positions of the saws independently of each other, and means for adjusting the saws in an edgewise direction independently of each other.

20. A stone sawing machine having, in combination, two arms pivoted to swing in parallel planes, a shaft bearing mounted on each arm and angularly adjustable on the arms relatively to their length, a saw mounted on each shaft, and means for rotating the shafts to actuate the saws.

21. A stone sawing machine having, in combination, a frame provided with ways, a carriage movable on the ways, two arms pivoted on the carriage to swing in parallel planes, a shaft bearing mounted on each arm and angularly adjustable on the arms relatively to their length, a saw mounted on each shaft, means for rotating the shafts to actuate the saws, and means for feeding the carriage along the ways.

22. A stone sawing machine having, in combination, a frame provided with ways, a carriage movable along the ways, a saw supported by the carriage through connections permitting angular adjustment of the saw about a line parallel to the direction of movement of the carriage on the ways, means for actuating the saw, and means for feeding the carriage along the ways.

In testimony whereof we have affixed our signatures in presence of two witnesses.

JULIUS WEGNER.
WILLARD F. MEYERS.

Witnesses:
 WM. ASHLEY KELLY,
 BERNARD COWEN.